(12) United States Patent
Suh et al.

(10) Patent No.: US 11,770,230 B2
(45) Date of Patent: *Sep. 26, 2023

(54) SYSTEMS AND METHODS FOR EXTREMELY HIGH THROUGHPUT SOUNDING PROCESS INDICATION

(71) Applicant: Huawei Technologies Co., Ltd., Shenzhen (CN)

(72) Inventors: Jung Hoon Suh, Ottawa (CA); Osama Aboul-Magd, Ottawa (CA); Yan Xin, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,308

(22) Filed: Jan. 20, 2022

(65) Prior Publication Data

US 2022/0224383 A1 Jul. 14, 2022

Related U.S. Application Data

(63) Continuation of application No. 16/856,652, filed on Apr. 23, 2020, now Pat. No. 11,251,841.
(Continued)

(51) Int. Cl.
*H04L 5/00* (2006.01)
*H04B 7/0452* (2017.01)
(Continued)

(52) U.S. Cl.
CPC ......... *H04L 5/0053* (2013.01); *H04B 7/0452* (2013.01); *H04B 7/0617* (2013.01);
(Continued)

(58) Field of Classification Search
CPC .. H04W 84/12; H04L 5/0044; H04L 27/2613; H04B 7/0452; H04B 7/0617; H04B 7/0897
(Continued)

(56) References Cited

U.S. PATENT DOCUMENTS 10,122,563 B1 11/2018 Sun et al.
10,219,271 B1 2/2019 Hedayat et al.
(Continued)

FOREIGN PATENT DOCUMENTS

CN 102396186 A 3/2012
CN 105376032 A 3/2016
(Continued)

OTHER PUBLICATIONS

IEEE Standard for Information Technology—telecommunications and Information Exchange Between Systems Local and Metropolitan Area Networks—Specific Requirements—part 11: Wireless LAN Medium Axxess Control (MAC) and Physical Layer (PHY) Specifications, IEEE Std 802.11—2016.
(Continued)

*Primary Examiner* — Emmanuel Bayard
(74) *Attorney, Agent, or Firm* — Slater Matsil, LLP

(57) ABSTRACT

Disclosed herein are devices, systems and methods between a between a plurality of collaborating Access Points (APs) and a receiving station (STA) operating in a wireless local area network (WLAN). The method include the steps of: transmitting, by each AP in the plurality of collaborating APs, a data frame to the receiving STA, each data frame has a preamble portion, the preamble portion including a signal (SIG) field, and the SIG field has a subfield including information representative of a total number of spatial streams transmitted by the plurality of collaborating Aps.

16 Claims, 7 Drawing Sheets

Related U.S. Application Data

(60) Provisional application No. 62/844,562, filed on May 7, 2019.

(51) Int. Cl.
  *H04B 7/08* (2006.01)
  *H04W 84/12* (2009.01)
  *H04B 7/06* (2006.01)
  *H04W 88/08* (2009.01)
  *H04L 27/26* (2006.01)

(52) U.S. Cl.
  CPC ......... *H04B 7/0897* (2013.01); *H04L 5/0044* (2013.01); *H04L 27/2602* (2013.01); *H04L 27/2613* (2013.01); *H04W 84/12* (2013.01); *H04W 88/08* (2013.01); *H04L 5/0048* (2013.01); *H04L 27/26136* (2021.01)

(58) Field of Classification Search
  USPC .......................... 375/260, 295, 302, 329, 340
  See application file for complete search history.

(56) References Cited

U.S. PATENT DOCUMENTS

| | | | |
|---|---|---|---|
| 10,959,121 | B1 | 3/2021 | Noh et al. |
| 11,251,841 | B2* | 2/2022 | Suh ...................... H04B 7/0617 |
| 2010/0260159 | A1 | 10/2010 | Zhang et al. |
| 2011/0051636 | A1 | 3/2011 | Van Nee et al. |
| 2012/0294294 | A1* | 11/2012 | Zhang .................. H04L 1/0079 370/474 |
| 2012/0300874 | A1 | 11/2012 | Zhang |
| 2013/0128806 | A1 | 5/2013 | Vermani et al. |
| 2013/0229996 | A1* | 9/2013 | Wang .................... H04W 72/20 370/329 |
| 2014/0328335 | A1 | 11/2014 | Zhang |
| 2014/0334420 | A1 | 11/2014 | You et al. |
| 2015/0009966 | A1 | 1/2015 | Lee et al. |
| 2016/0088637 | A1 | 3/2016 | Suh et al. |
| 2016/0204912 | A1* | 7/2016 | Sun ........................ H04L 27/12 375/302 |
| 2017/0048048 | A1* | 2/2017 | Seok .................... H04L 1/1621 |
| 2017/0048882 | A1 | 2/2017 | Li et al. |
| 2017/0181136 | A1* | 6/2017 | Bharadwaj .......... H04W 72/042 |
| 2018/0167821 | A1* | 6/2018 | Seok .................... H04L 5/0094 |
| 2018/0278308 | A1* | 9/2018 | Jin ....................... H04B 7/0452 |
| 2019/0075469 | A1 | 3/2019 | Mahoney et al. |
| 2019/0132155 | A1 | 5/2019 | Jiang et al. |
| 2019/0305989 | A1* | 10/2019 | Yu ....................... H04L 27/2602 |
| 2020/0112408 | A1 | 4/2020 | Verma et al. |
| 2020/0328925 | A1* | 10/2020 | Yu ............................ H04L 5/00 |

FOREIGN PATENT DOCUMENTS

| | | | | |
|---|---|---|---|---|
| EP | 2747359 | A1 * | 6/2014 | .......... H04B 7/0452 |
| WO | 2018093132 | A1 | 5/2018 | |

OTHER PUBLICATIONS

Garcia-Rodriguez, A., et al., "Coordinated Null Steering for EHT", doc.:IEEE 802.11-19/0401 r0, Mar. 6, 2019, 17 Pages.

Park, S., et al., "Multi-AP Transmission Procedure", doc.: IEEE 802.11-19/0048r0, Mar. 11, 2019, 18 Pages.

* cited by examiner

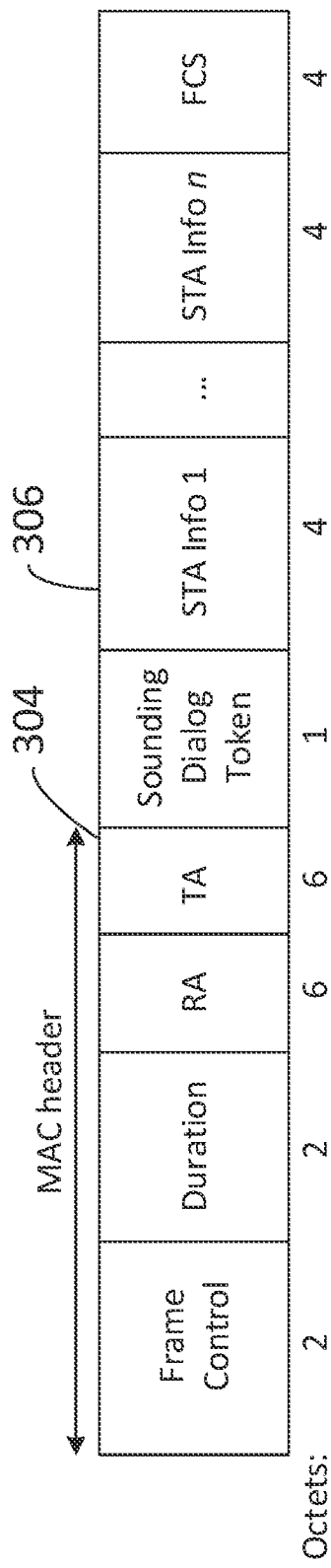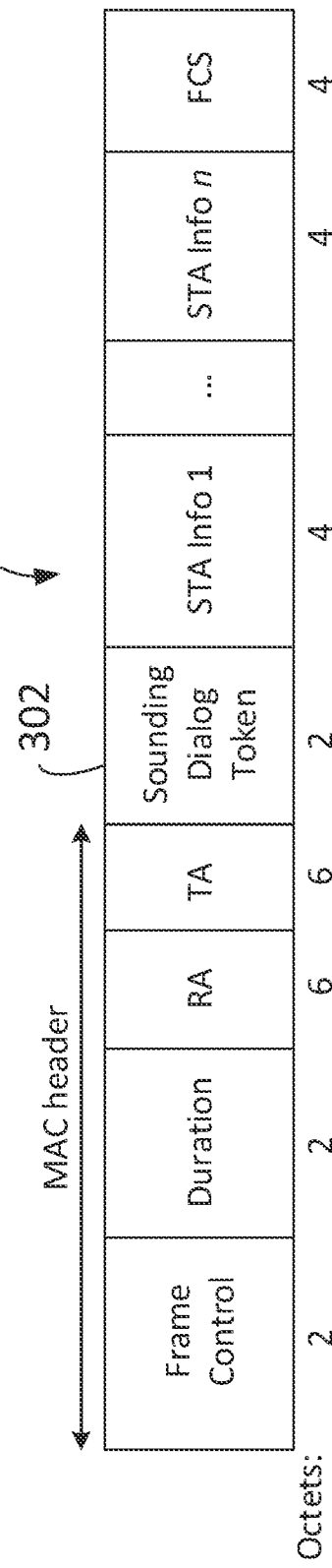

802.11ax Sounding Dialog Token field format

SYSTEMS AND METHODS FOR EXTREMELY HIGH THROUGHPUT SOUNDING PROCESS INDICATION

CROSS-REFERENCE TO RELATED APPLICATIONS

This application is a continuation of U.S. patent application Ser. No. 16/856,652, filed on Apr. 23, 2020, now U.S. Pat. No. 11,251,841 issued Feb. 15, 2022, which claims the benefit of U.S. Provisional Application No. 62/844,562, filed on May 7, 2019, both of which are hereby incorporated herein by reference.

TECHNICAL FIELD

The present application relates to wireless communication systems having a plurality of wireless transmitting communication devices that collaborate to transmit information to one or more wireless receiving communication devices.

BACKGROUND

Wireless local area network (WLAN) communication systems include wireless communication devices that transmit and receive signals, including access points (APs), that function as an interface between the WLAN and one or more further networks, and stations (STA) that exchange signals with the APs.

In some cases, a plurality of APs may work in collaboration to communicate with one or more STAs in a WLAN. For example, the proposed IEEE 802.11be standard is being developed to support a next generation of Extremely High Throughput (EHT) WLAN. EHT communication may be achieved with AP collaboration, which can utilize coordination between multiple APs to minimize interference and improve quality of service for communications with STAs.

Improvements are desired to facilitate the coordination of multiple APs in a collaboration mode to communicate with one or more STAs.

SUMMARY

According to one example aspect, there is a method of communication between a plurality of collaborating Access Points (APs) and a receiving station (STA) operating in a wireless local area network (WLAN). The method includes the steps of: transmitting, by an AP in the plurality of collaborating APs, a control signal for the receiving STA, the control signal comprising a null data packet announcement (NDPA) frame including a type indicator that indicates a type of channel sounding process.

In some embodiments, the type indicator includes a type indication subfield.

In some embodiments, the type indication subfield has a length of 2 bits.

In some embodiments, the type indication subfield is in a sounding dialog token field, the sounding dialog token field having a length of 16 bits.

In some embodiments, the sounding dialog token field has a second subfield, the second subfield including information representative of a total number of the collaborating APs.

In some embodiments, the type indication subfield is in a STA information field that is different from a sounding dialog token field.

In some embodiments, the STA information field has a second subfield, the second subfield including information representative of a total number of the collaborating APs.

In some embodiments, the type indication subfield includes a binary value representative of at least one of the following sounding process: High Efficiency (HE), Very High Throughput (VHT), and Extremely High Throughput (EHT).

In some embodiments, the type indicator includes a Transmitter's Address (TA) field, the TA field comprising a Basic Service Set identifier (BSSID) subfield having a pre-defined value to indicate an AP collaboration mode.

According to another example aspect, there is a method of communication between a plurality of collaborating Access Point (APs) and a receiving station (STA) operating in a wireless local area network (WLAN). The method includes the steps of: transmitting, by each AP in the plurality of collaborating APs, a data frame to the receiving STA; wherein each data frame includes a preamble portion, the preamble portion including one or more training fields.

In some embodiments, the method may include transmitting the preamble portion to the receiving STA based on a beamforming steering matrix that is used to transmit a payload portion of the data frame.

In some embodiments, a SIG field in the preamble portion includes a first subfield including information representative of a total number of signal streams transmitted by the plurality of collaborating APs.

In some embodiments, the SIG field in the preamble portion includes a second subfield including information representative of a total number of signal streams transmitted by the corresponding AP to the receiving STA.

In some embodiments, the SIG field in the preamble portion includes a third subfield including information representative of a total number of Long Training Fields (LTF) symbols based on the information in the first subfield.

In some embodiments, the total number of LTF symbols is equivalent to the total number of signal streams transmitted by the plurality of collaborating APs.

In some embodiments, each of the signal streams carries a spatial stream.

According to one example aspect, there is a wireless transmitting device configured to perform any of the above methods.

According to another example aspect, there is a method of communication between a plurality of collaborating Access Point (APs) and a receiving station (STA) operating in a wireless local area network (WLAN). The method includes the steps of: transmitting, by a receiving STA from the plurality of receiving STAs to one or more APs in the plurality of collaborating APs, a beamforming control signal, the beamforming control signal comprising a compressed beamforming action (CBA) frame including a first subfield decodable by the one or more wireless APs; wherein the beamforming control signal includes one or more compressed beamforming reports (CBRs), each of the one or more compressed beamforming reports corresponding to an AP in the plurality of collaborating APs; and wherein the first subfield includes information represented by a bit pattern, the bit pattern configured to indicate the correspondence between the one or more compressed beamforming reports and the one or more APs.

In some embodiments, a length of the first subfield in bits is equivalent to the total number of the plurality of collaborating APs, and each bit in the bit pattern corresponds to an AP in the plurality of collaborating APs.

In some embodiments, when an $n^{th}$ bit in the bit pattern includes a string of "0", the control signal does not have a compressed beamforming report for the corresponding $n^{th}$ wireless transmitting device.

In some embodiments, the beamforming control signal includes two or more compressed beamforming reports, and at least two of the two or more compressed beamforming reports are separated by a delimiter.

According to yet another example aspect, there is a method of communication between a plurality of collaborating APs and a receiving STA operating in a wireless local area network (WLAN). The method includes the steps of: transmitting, by the receiving STA to one or more APs in the plurality of collaborating APs, a beamforming control signal, the beamforming control signal comprising a compressed beamforming action frame decodable by the one or more APs; wherein the beamforming control signal includes one or more compressed beamforming reports (CBRs), each of the one or more compressed beamforming reports corresponding to an AP in the one or more APs; and wherein the beamforming control signal includes an Nr Index subfield including information representative of a number of rows of a feedback matrix for and placed ahead of each report of the one or more compressed beamforming reports.

According to one example aspect, there is a method of communication between a plurality of collaborating Access Point (APs) and a receiving station (STA) operating in a wireless local area network (WLAN). The method includes the steps of: transmitting, by each AP in the plurality of collaborating APs, a respective a null data packet (NDP) frame to the receiving STA; wherein each NDP frame includes a SIG field, the SIG field including information representative of a Basic Service Set identifier (BSSID) configured to be used by the receiving STA to determine a correct NDP frame for estimating a feedback matrix during a sounding process between the respective AP and the receiving STA.

In some embodiments, the BSSID includes a BSS color.

BRIEF DESCRIPTION OF THE DRAWINGS

Reference will now be made, by way of example, to the accompanying drawings which show example embodiments of the present application, and in which:

FIG. 3A illustrates a null-data packet announcement (NDPA) frame format based on the IEEE 802.11ax standard;

FIG. 3B illustrates a NDPA frame format according to an example embodiment;

Similar reference numerals may have been used in different figures to denote similar components.

DETAILED DESCRIPTION OF ILLUSTRATIVE EMBODIMENTS

Figure 1:
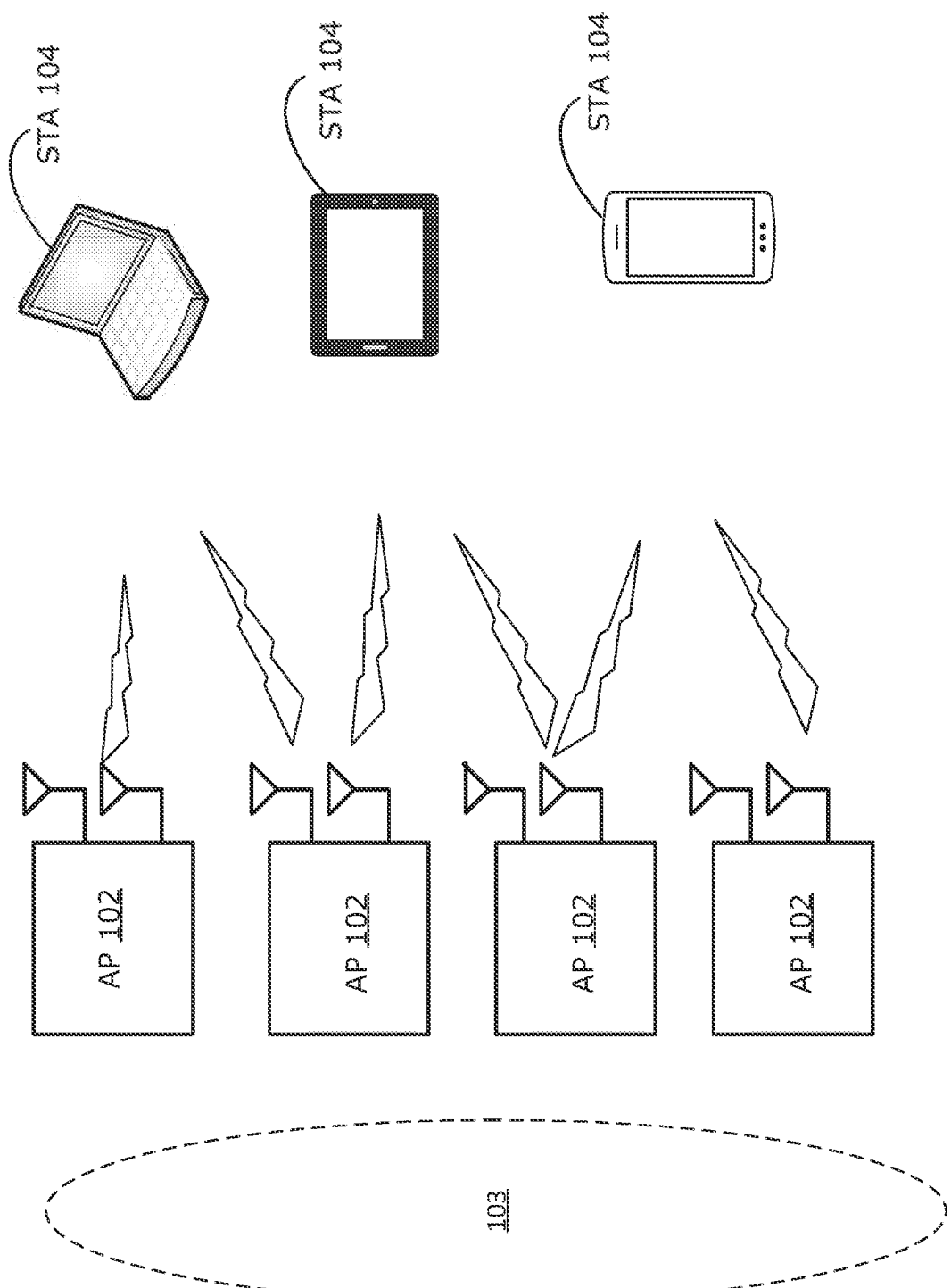
FIG. 1 is a block diagram illustrating communications between multiple Access Points (APs) and multiple stations (STAs)

FIG. 1 shows a wireless local area network (WLAN) that includes a plurality of wireless communication devices configured to transmit and receive wireless signals according to example embodiments. The wireless communication devices include access points (APs) 102 and stations (STAs) 104. In example embodiments, APs 102 are configured to function as an interface between one or more STAs 104 and one or more further networks 103. Each STA 104 is associated through a registration procedure with one or more of the APs 102. In example embodiments, APs 102 may operate collaboratively as a group in an AP collaboration mode. For example, APs 102 in group of collaborating APs 102 can communicate with one or more stations (STAs 104) using a Beamforming (BF) technology such as Coordinated BF (CBF) or Joint Transmission (JT). In some example embodiments, each AP 102 in a group of collaborating APs 102 collects channel state information (CSI) information for all the STAs 104 that are associated with any of the collaborating APs 102. For example, each AP 102 may collect CSI information for the STAs 104 that the AP 102 is associated with as well as CSI information for STAs 104 that are associated with the other APs 102 in the AP collaboration.

There has been interest in including support in the IEEE 802.11 family of standards to enable extremely high throughput (EHT) wireless communications (being studied by the Task Group referred to as TGbe). For example, EHT operations beyond 160 MHz bandwidth, such as operations in bandwidths in the range of 180 MHz to 320 MHz (e.g., 180 MHz, 200 MHz, 220 MHz, 240 MHz, 260 MHz, 280 MHz, 300 MHz, or 320 MHz bandwidths) may be considered.

In one or more example embodiments described herein, frame formats specified in the IEEE 802.11ax and IEEE 802.11ac standards (that respectively support High Efficiency (HE) WLAN communications and Very High Throughput (VHT) WLAN communications) are modified to support AP collaboration in EHT WLAN communications. For example, one or more of the NDPA frame, NDP frame, and Compressed Beamforming Report Action frame formats specified in the IEEE 802.11ax standard are modified to facilitate coordination of APs 102 and STAs 104 in an AP collaboration mode that supports EHT WLAN communications.

As shown in FIG. 1, multiple collaborating APs 102 may communicate with multiple STAs 104 in a WLAN. In some embodiments, collaborating APs may synchronize their data transmissions to reduce signal interference. For example, the collaborating APs 102 may use coordinated orthogonal frequency-division multiple access (OFDMA) to synchronize data transmissions in a collaborating mode. In other embodiments, two or more collaborating APs 102 may perform a joint data transmission to or reception from multiple STAs reusing the same time/frequency resources. The collaborating APs 102 are configured to jointly process both the data and the channel state information (CSI) of all STAs 104 involved in the data transmission or reception. In this case, an AP 102 in the collaborating APs 102 may act as a Master AP, whose job is to coordinate and facilitate over-the-air synchronization of the collaborating APs 102 using inter-AP control signals. In some instances, the APs 102 may communicate using a backhaul network, such as network 103.

Because each AP 102 may have multiple antennas, a STA 104 may receive, simultaneously or near simultaneously, multiple signal streams from one or more APs 102. In order to adapt data transmissions to current channel conditions, it is necessary for each AP 102 to know various channel properties of a communication link between the AP 102 and a particular STA 104. The channel properties of the communication link may be referred to as channel state information (CSI). The CSI describes how a signal propagates from the transmitter (which may be either the AP 102 or the STA 104) to the receiver (which may be either the STA 104 or the AP 102) and represents the combined effect of, for example, scattering, fading, and power decay with distance. The CSI information may include a feedback matrix that is included in a compressed beamforming report (CBR) sent by a STA 104 to an AP 102. In some embodiments, the feedback matrix may be calculated by the STA 104 based at least in part on information sent to the STA 104 by the AP 102. The process to learn and estimate such channel properties is known as a channel sounding process or simply a sounding process.

Figure 2:
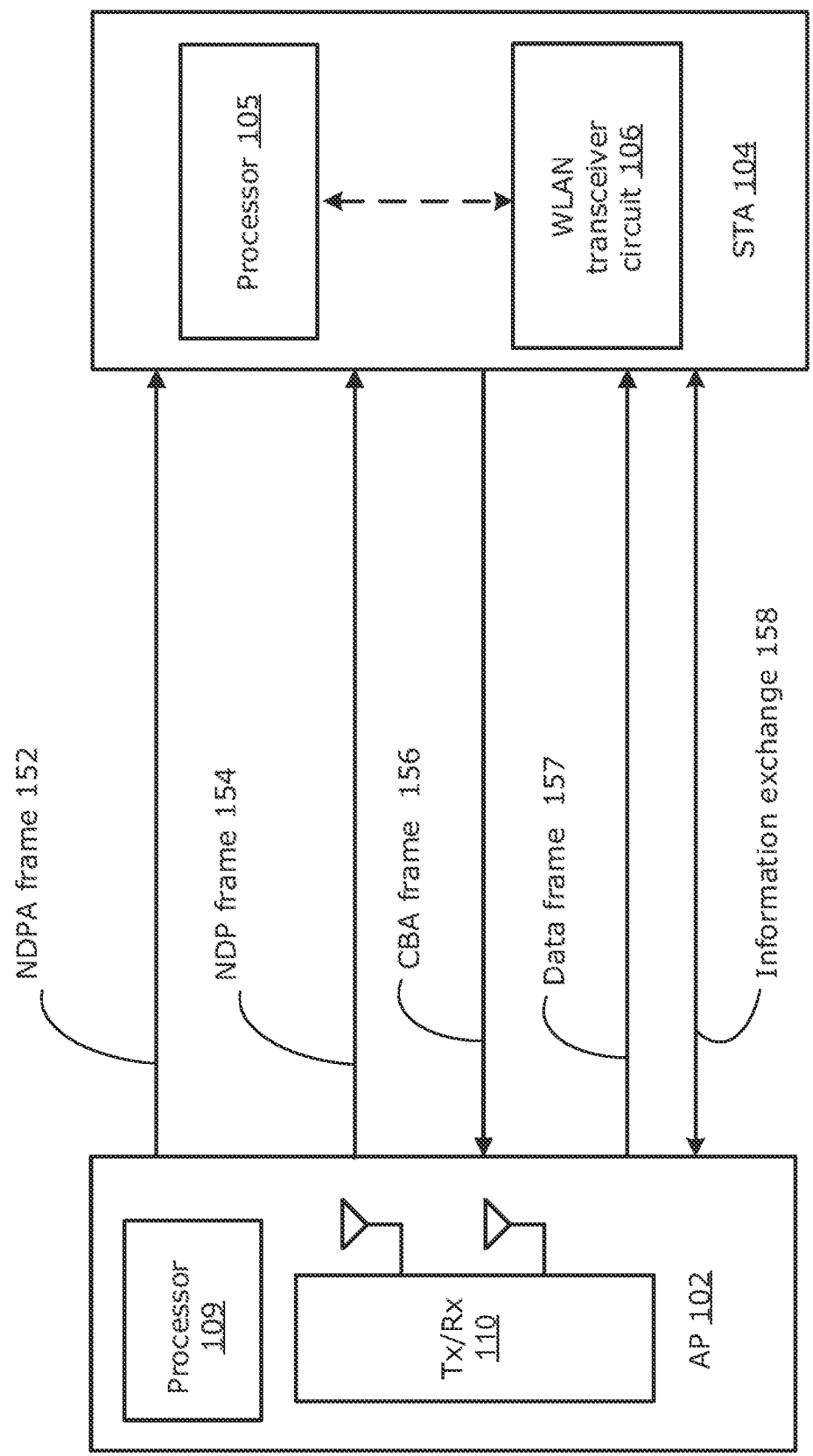
FIG. 2 is a block diagram illustrating communications including a sounding process between an AP and a STA.

FIG. 2 illustrates an example schematic diagram showing an AP 102 in communication with a STA 104. An example AP 102 includes at least a processor 109 and a wireless local area network (WLAN) transceiver circuit 110. An example STA 104 includes at least a processor 105 and a WLAN transceiver circuit 106 (e.g., a Wi-Fi transceiver) for exchanging signals through a wireless interface with the WLAN transceiver circuit 110 of AP 102.

FIG. 2 also illustrates a set of example signals that may be communicated for performing a channel sounding process between an AP 102 and a STA 104. Each of the APs 102 intending to communicate with a STA 104 initiates a channel sounding process by sending a null data packet announcement (NDPA) frame 152 to the STA 104, as described below.

To initiate the channel sounding process, the AP 102 sends a control signal, carrying a null data packet announcement (NDPA) frame 152 (described further below) to all the STAs 104 with which the AP 102 intends to communicate ("the target STA(s) 104"). The NDPA frame 152 begins the channel sounding process and its primary purpose is to carry a STA info field for each target STA 104. If an AP 102 intends to communicate with multiple target STAs 104, the AP can broadcast the same NDPA frame 152 to all the STAs 104 in the WLAN, where the NDPA frame 152 includes some fields common and applicable to all the target STAs 104, and a separate STA information field for each of the target STAs 104. Each AP 102 may send a NDPA frame 152 to all target STAs 104. It is possible that different APs 102 may each have a different set of target STA(s) 104 in a sounding process, and the NDPA frame 152 sent by each AP 102 identifies the target STAs 104 of the transmitting AP 102. A STA 104 in the network may receive a NDPA frame 152 but determine that it is not an intended target STA based on the information in the NDPA frame 152. The STAs 104 not identified by a NDPA frame 152 sent by a particular AP 102 may simply defer channel access for the particular AP 102 until the sounding process is completed.

Following the NDPA frame 152 and a short interframe space (SIFS) period, the AP 102 transmits a further control signal, which carries a null data packet (NDP) frame 154, to each of the target STAs 104, further described below. The NDP frame 154 generally has no data field, and includes training fields that contain symbols which will be used by the target STA(s) 104 to generate a compressed beamforming action (CBA) frame 156 that includes one or more compressed beamforming reports (CBRs). If a STA 104 is designated as a target STA 104 by a single AP 102, then the CBA frame 156 may include only a single CBR for the AP 102. If the STA 104 is designated as a target STA 104 by a plurality of collaborating APs 102, then the CBA frame 156 may include multiple CBRs, with each CBR including a feedback matrix estimated by the target STA 104 for a corresponding AP 102 in example embodiments. The feedback matrix is calculated by the STA 104 based on information received in the NDPA frame 152 and NDP frame 154, and may take the form of a sequence of angles in a compressed form. Once the STA 104 has generated the CBA frame 156, it transmits the CBA frame 156 back to the collaborating APs 102. Appropriate information exchange 158 between the AP 102 and the STA 104 may then take place, for each AP-STA communication pair.

In some embodiments, after gathering all the CBA frames 156, each collaborating AP 102 can transmit a data frame 157, which may be a beamformed data frame, with multiple data streams to the target STAs 104. If the STAs 104 correctly decode the data in the data frame 157, the STAs 104 send back an acknowledgement (ACK) (not shown in FIG. 2) frame to the AP 102, after which the AP 102 may begin information exchange 158.

In one example embodiment, in order to facilitate collaboration of multiple APs 102 with each other in order to transmit and receive signals with at least one STA 104, the format of NDPA frame 152, which can be transmitted by one or more APs 102, such as a Master AP 102 in the group of collaborating APs 102, is modified from the NDPA frame format specified in the IEEE 802.11ax standard.

Figure 4A:
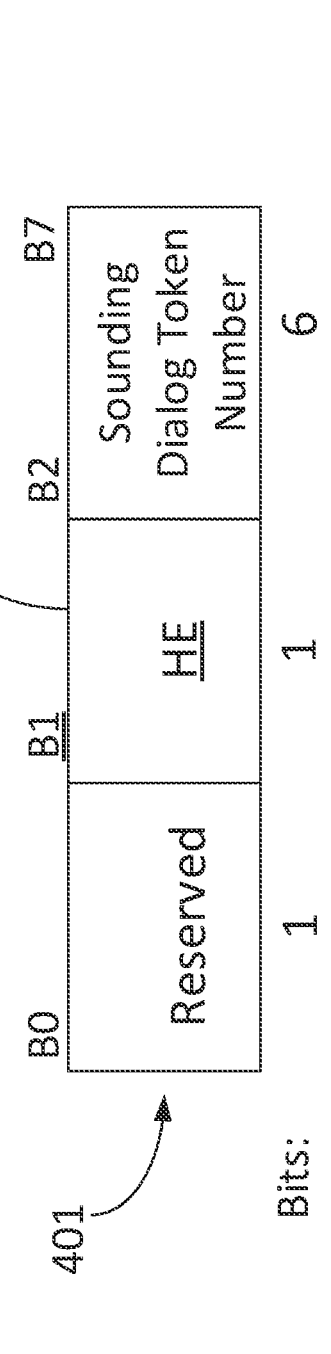
FIG. 4A illustrates a sounding dialog token field format based on the IEEE 802.11ax standard.

FIG. 3A shows an example NDPA frame in accordance with the IEEE 802.11ax standard. As shown, the frame may include a MAC header including subfields such as frame control (2 bytes), duration (2 bytes), RA (Recipient Address, 6 bytes), and TA (Transmitter Address, 6 bytes). The frame may further include subfields including a sounding dialog token field (1 byte), one or more STA info fields (4 bytes each), with each STA info field intended for a separate STA 104, and a FCS (frame check sequence) field (4 bytes). FIG. 4A shows an example format for a sounding dialog token field format of the NDPA frame of FIG. 3A in accordance with the IEEE 802.11ax standard, which has a reserved field (1 bit), a HE field (1 bit), and a sounding dialog token number (6 bits).

In some embodiments, the NDPA frame includes a type indicator used to indicate a type of the sounding process between an AP 102 and a STA 104. The type indicator can indicate, for example, if the sounding process is a single AP sounding process, or an AP collaboration sounding process. For another example, the type indicator can indicate if the sounding process is HE, VHT, or EHT, as further described below.

Figure 4B:
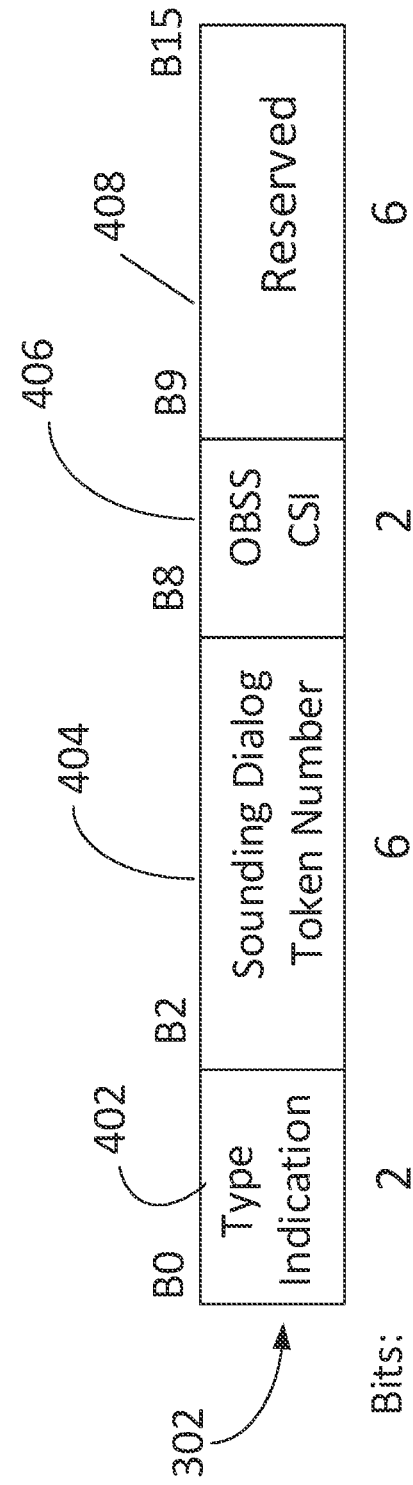
FIG. 4B illustrates a sounding dialog token field frame format according to an example embodiment.

In example embodiments, the NDPA frame illustrated in FIG. 3A is adapted for EHT, for use either for a single AP sounding or for AP collaboration sounding. In this regard, FIG. 3B illustrates the format of an EHT NDPA frame 152 according to example embodiments. The format of NDPA frame 152 is similar to the NDPA frame format shown in FIG. 3A, except that the sounding dialog token field 302 of NDPA frame 152 is 2 bytes and includes additional information. FIG. 4B shows an example format for the sounding dialog token field 302 of NDPA frame 152, which includes a type indication subfield 402 (2 bits), a sounding dialog token number subfield 404 (6 bits), an Overlapped Basic Service Set (OBSS) CSI subfield 406 (2 bits) and a reserved subfield 408 (6 bits).

In an example embodiment, the type indication subfield 402 may be set to indicate a type of sounding process. A target STA 104 can generate a compressed beamforming report that corresponds to the type of sounding process in the subfield 402. For example, the type indication field 402 may indicate if the sounding process is a HE sounding process, a VHT sounding process, or an EHT sounding process.

In some example embodiments, the two bits of the type indication subfield 402 in FIG. 4B may be set to have the following type definitions:
type indication subfield=10: EHT Sounding Process;
type indication subfield=01: HE Sounding Process;
type indication subfield=00: VHT Sounding Process.

In some example embodiments, the OBSS CSI subfield 406 may be used to indicate a number of NDP frames 154 that are to be transmitted immediately following the NDPA frame 152. The target STAs 104 who need to participate in the sounding process to generate the CBRs are listed in the STA Info subfields of NDPA frame as seen in FIG. 3B. In this sense, the OBSS CSI subfield 406 represents a total number of APs 102 that are in collaboration and transmitting signals in the WLAN communication network. For example, the 2 bits of the OBSS CSI subfield 406 in can be set have the following definitions:
OBSS CSI subfield=00: No AP collaboration, i.e., Single AP sounding;
OBSS CSI subfield=01: 2 AP collaboration, i.e., 2 NDP frames will follow successively right after the NDPA transmission;
OBSS CSI subfield=10: 3 AP collaboration, i.e., 3 NDP frames will follow successively right after the NDPA transmission;
OBSS CSI subfield=11: 4 AP collaboration, i.e., 4 NDP frames will follow successively right after the NDPA transmission.

In example embodiments, the length of the OBSS CSI subfield 406 can be varied to support a greater number of collaborating APs. For example, a 3 bit OBSS CSI subfield 406 can be used to support up to eight APs 102 in collaboration. In such embodiments, the length of the reserved subfield 408 can be adjusted accordingly (e.g. from 6 bits to 5 bits) to maintain the length of the sounding dialog token field 302 at 2 bytes.

In alternative example embodiments, the number of collaborating AP's can be indicated in NDPA frame 152 by a different means than including OBSS CSI subfield 406 in the sounding dialog token field 302. For example, in an alternative frame format, a subfield in a STA Info field of the NDPA frame 152 could be used to indicate the total number of collaborating APs. In some example embodiments, the STA Info field could include a second subfield, the second subfield including information representative of a total number of APs in collaboration.

In alternative example embodiments, rather than using specific type indication subfield 402 in NDPA frame 152, the TA field 304 of the IEEE 802.11ax NDPA frame of FIG. 3A may be implemented as a type indicator to indicate a type of the sounding process, including for example to indicate whether the NDPA frame is for a single AP sounding process or an AP collaboration sounding process. The TA field 304 may be used to determine if the sounding process initiated by the NDPA frame is a single AP sounding process or an AP collaboration sounding process. For example, if the Transmitter's Address in the TA field 304 is the same as a STA's associated Basic Service Set identifier (BSSID), the NDPA frame indicates a single AP sounding process as contemplated by the IEEE 802.11ax standard. However, if the Transmitter's Address in the TA field 304 is different from each STA's associated BSSID, the NDPA frame indicates an AP collaboration sounding process. The STA's associated BSSID can be included in the STA information field 306 in the NDPA frame. In some examples, the TA field 304 can be set to a MAC address of the AP 102 that transmits the NDPA frame. In some examples, the TA field 304 can include a Basic Service Set identifier (BSSID) subfield having a pre-defined value to represent the Transmitter's Address. In such an embodiment, the size of the sounding dialog token subfield can be 1 byte. In some embodiments, when the NDPA frame indicates an AP collaboration sounding process, the STA 104 may assume that the type of sounding process is EHT. In some embodiments, when the NDPA frame indicates a single AP sounding process, the STA 104 may look at an additional subfield in the sounding dialog token field 401 as shown in FIG. 4A to determine a specific type of the single AP sounding process.

FIG. 4A shows an example sounding dialog token field 401 in accordance with IEEE 802.11ax standard. The sounding dialog token field 401 may include a subfield 403 further indicating a type of a sounding process: e.g. a HE or non-HE sounding process. An example of the non-HE sounding process may be a VHT sounding process. For example, the 1 bit of the subfield 403 in FIG. 4A may be set to have the following type definitions:
type indication subfield=1: HE Sounding Process
type indication subfield=0: Non-HE Sounding Process As noted above, following the NDPA frame 152, one or more NDP frames 154 are transmitted from an AP or APs 102 to one or more target STAs 104. Each STA 104 can analyze the training fields (e.g. Long Training Fields) included in its respective NDP frame 154 to calculate a specific channel response. The STA 104 can then use the specific channel response information to determine the appropriate CSI to include in a CBR for the NDP frame 154. The CBR is then included in a CBA frame 156 and transmitted by the STA 104 to provide CSI feedback (FB) to the AP 102. For example, the CBR included in CBA frame 156 can be extracted and used by the AP 102 to calculate a BF steering matrix to direct transmission towards the specific STA 104 during the data transmission 158.

In some embodiments, a signal field or SIG field in each NDP frame 154 can include a subfield to indicate which NDP frame 154 should be used to estimate for sounding for a particular STA 104. For example, each NDP frame 154 that follows the NDPA frame 152 may include a subfield, the subfield including information representative of an identifier for a Basic Service Set (BSS) configured to be used by the STA 104 to generate a sounding feedback for the corresponding AP 102. The identifier for a BSS used in the subfield may be a BSS color.

In some embodiments, after gathering all the CBA frames 156, each collaborating AP 102 can transmit a data frame 157, which may be a beamformed data frame 157, with multiple data streams to the target STAs 104. The data frame 157 can include a preamble portion and a payload portion. In case of a transmission in an AP Collaboration mode when multiple collaborating APs 102 are transmitting, a preamble portion which includes one or more signal (SIG) fields can be beamformed with the same beamforming steering matrix as applied to the payload portion.

When the CBR is received as part of a CBA frame 156 and processed by an AP 102, the scheduling information such as the number of LTF symbols (represented by the subfield N_LTF), the number of transmitter (TX) streams, beamforming steering matrix, and so on, may be independent of the other collaborating APs 102, once the CSI information is collected from all the participant STAs 104. However, in this case, the leakage interferences from other APs 102 in the collaboration may degrade the performance.

Hence, a data frame 157 sent from each collaborating AP 102 may include an indication for the number of all the TX streams including the interferences coming from the other APs 102 in collaboration. For example, the scheduling information such as the number of streams for its own BSS, the corresponding stream index for resolvable LTFs and the number of STAs in case of MU-MIMO in its own BSS, may be shared among collaborating APs 102 in advance, and the number of total TX streams including interferences and the new number of LTFs may be indicated in the SIG field.

In some embodiments, the APs 102 that are collaborating in collaboration mode each shares Coordinated Beamforming (CBF) scheduling information with the other AP 102's in the collaboration. For example, each AP 102 may indicate the number of streams transmitted by the AP 102 to the STAs 104 that the AP 102 is associated with, the corresponding stream index for resolvable LTFs, and the total number of STAs 104 in case there are multiple STAs to schedule per BSS associated with the AP 102 for which the AP 102 must schedule transmissions. This information can be shared between the collaborating APs 102 in advance before the actual data transmissions from multiple APs 102 takes place.

Figure 6:
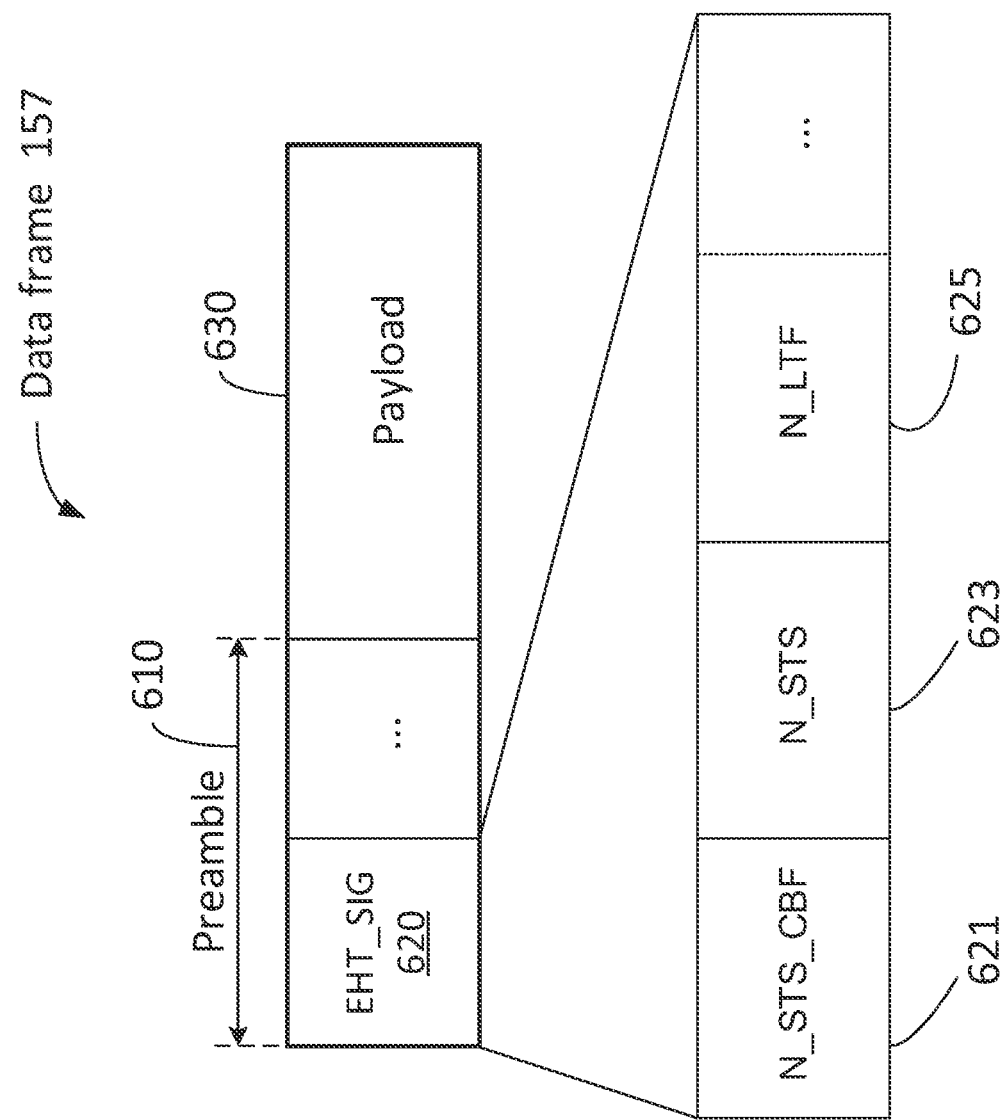
FIG. 6 illustrates an example data frame format according to an example embodiment.

FIG. 6 shows an example data frame 157 transmitted from one collaborating AP 102 among a plurality of collaborating APs 102 to a receiving STA 104, in accordance with some embodiments. The data frame 157 includes a preamble portion 610 and may include a payload portion 630 after the preamble portion 610. The payload portion 630 may carry payload data. The preamble portion 610 may include a signal (SIG) field such as EHT_SIG fields 620. Each EHT_SIG field 620 may include one or more subfields 621, 623, 625 as described herein.

In some embodiments, a "N_STS in collaboration" subfield (or in short "N_STS_CBF") 621 may be included in an EHT SIG field 620 (e.g., an EHT_SIG_A or EHT_SIG_B field). The N_STS_CBF subfield 621 may include information representative of the total number of signal streams transmitted by all the APs 102 in collaboration. This information can be used by each STA 104 that is associated with an AP 102 to optimize MIMO detection using the resolvable LTFs. In some example embodiments, the EHT SIG field 620 can include a further subfield 623 to indicate the total number of spatial streams used by each respective AP 102 for associated STAs 104, which can be a subfield denoted as N_STS subfield 623. The N_STS subfield 623 can enable a receiving STA 104 to recover its own corresponding streams and can discard the unwanted streams which correspond to the other STAs 104 in the OBSS. The received data frame 157 can be considered to be a single AP transmission when the N_STS_CBF subfield 621 has a value that is equivalent to the value in the N_STS subfield 623, otherwise the received frame can be considered to be sent in an AP collaboration mode. In this embodiment, there is therefore no need for a separate bit to indicate AP collaboration mode in the EHT SIG field.

In example embodiments, the total number of LTF symbols, as represented by a value in an optional N_LTF subfield 625 in the EHT_SIG field 620, is determined based on the N_STS_CBF according to the IEEE 802.11ax standard. For example, N_LTF generally is equal to N_STS_CBF, because the total number of LTF symbols is equivalent to the total number of signal streams transmitted by the plurality of APs 102.

Figure 5:
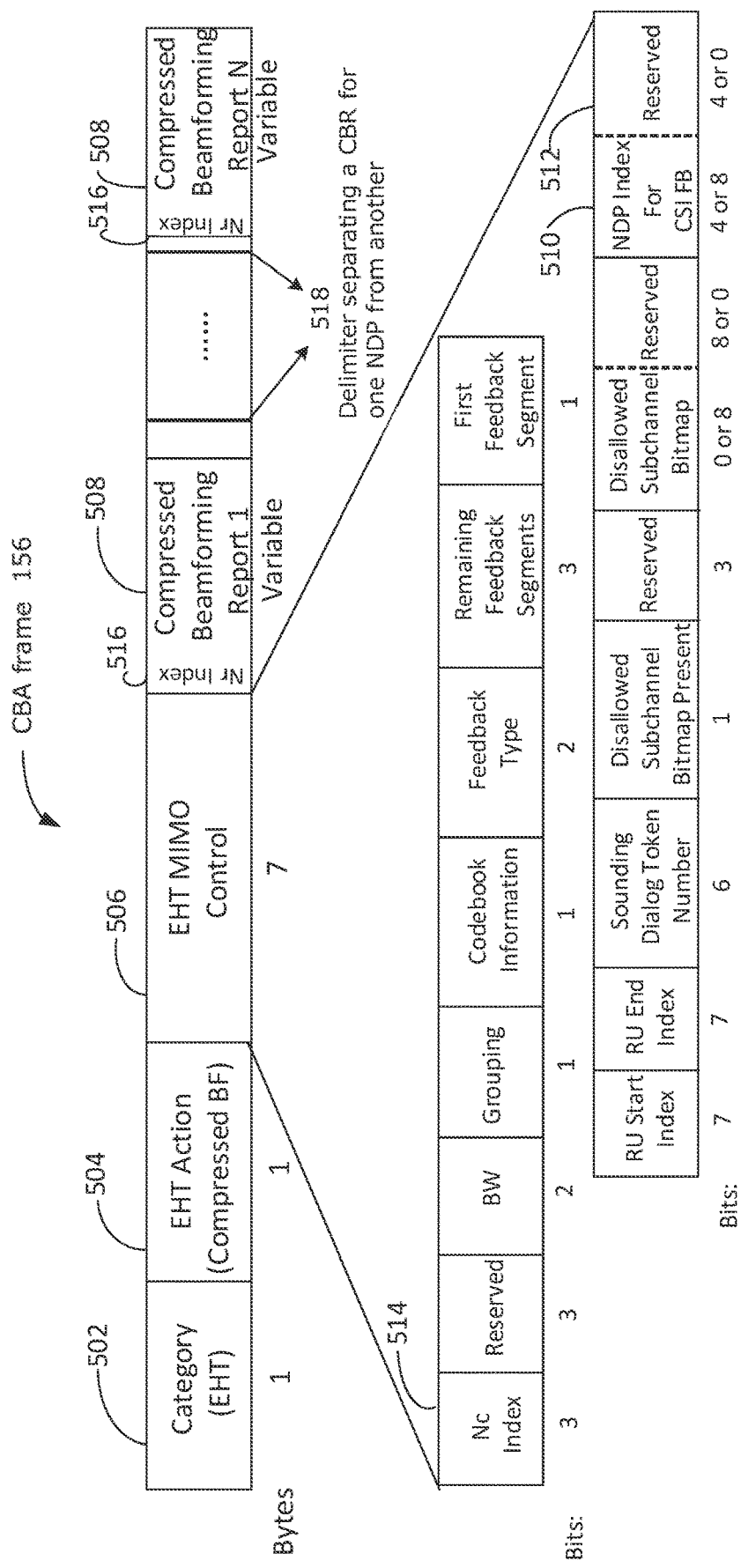
FIG. 5 illustrates a compressed beamforming action frame (CBAF) format according to an example embodiment.

FIG. 5 shows an example of a CBA frame 156 in accordance with some example embodiments. A CBA frame 156 may be sent by a STA 104 to one or more APs 102. As shown, the CBA frame 156 includes a category field 502 (e.g. EHT, 1 byte), an EHT Action field 504 (1 byte), an EHT MIMO control field 506 (7 byte), and one or more compressed beamforming report (CBR) fields 508 separated by delimiters. There may be a CBR field 508 for each AP 102 collaborating in the collaboration mode. The EHT MIMO Control field 506 may include a subfield, namely, NDP index subfield 510, that is used to indicate the presence or absence of CSI feedback (FB) in the CBA frame 156 for the APs 102. In this regard, in example embodiments, the NDP index subfield 510 may use pre-defined bit patterns to associate the CBRs included in the CBA frame 156 with the NDP frames 154 (and corresponding APs 102) that the CBRs have been generated in respect of. In example embodiments, the sizes of NDP index subfield 510 and a following reserved subfield 512 are adjusted depending on the size of AP collaboration limit. For example, if the total number of APs 102 collaborating in AP collaboration mode is 4, the size NDP index subfield 510 is 4 bits, and the size of the following reserved subfield 510 is 4 bits. For any bit in this 4-bit NDP Index subfield 510, a value of "1" indicates a positive presence of a CBR corresponding to an NDP frame 154 sent by an associated AP 102 that corresponds to the bit position, and a value of "0" indicates a negative presence of a CBR to the corresponding NDP frame 154 and AP 102. For example, the bit pattern 1111 represents that the four CBRs in included in CBR fields 508 are being sent in response to respective NDP frames 514 sent by all four collaborating APs 102. In a further example, the bit pattern 1011 represents that a CBR for a NDP frame 154 sent by the second AP 102 is missing from the CBR fields 508 of CBA frame 156, and that all other CBRs are present.

When the total number of APs 102 participating in the AP collaboration mode is 8, the size of this NDP index subfield 510 is 8 bits, and thus, the reserved subfield 512 which follows is not present. For any bit in this 8-bit NDP Index subfield, a value of "1" indicates a positive presence of a CBR for the corresponding NDP frame 154 and AP 102, and a value of "0" indicates a negative presence of a CBR for the corresponding NDP frame 154 and AP 102. For example, the bit pattern 11111111 represents that the following eight CBRs are the CSI reports in response to those NDP packets, which have come from all eight APs in the AP collaboration mode. For another example, the bit pattern 11011111 represents that the CBR to the $3^{rd}$ NDP packet is missing in the CBRs that followed the NDP index subfield, and that all other CBRs are present.

In some embodiments, in a CBA frame 156 sent by a STA 104, a delimiter 518 is used to separate the CBR generated in response to an NDP frame 154 from the CBR generated in response to another NDP frame 154. A delimiter 518 can be a subfield having a pre-defined value that indicates an end of an immediately preceding CBR 508 in the CBA frame 156.

In example embodiments, the CBA frame 156 includes an Nc Index subfield 514 and Nr Index subfields 516 that describe the size of the feedback matrix used for CBRs in terms of the number of columns and the number of rows, respectively. In some embodiments, the Nc Index subfield 514 will include the same value for the CBRs 508 included in the CBA frame 156, and is included in the EHT MIMO Control field 506. However, because the Nr Index (e.g. row number) is an AP dependent parameter, the content of the Nr index subfield 516 may be different for different CBRs depending on the AP 102 that the CBR is generated in respect of. Accordingly, in CBA frame 156 that is used to support AP collaboration mode, a respective Nr Index subfield 506 is included before each CBR field 508. In some examples, a respective AP ID subfield (which may for example include a BSS color value) may be included before each CBR field 508.

Figure 7:
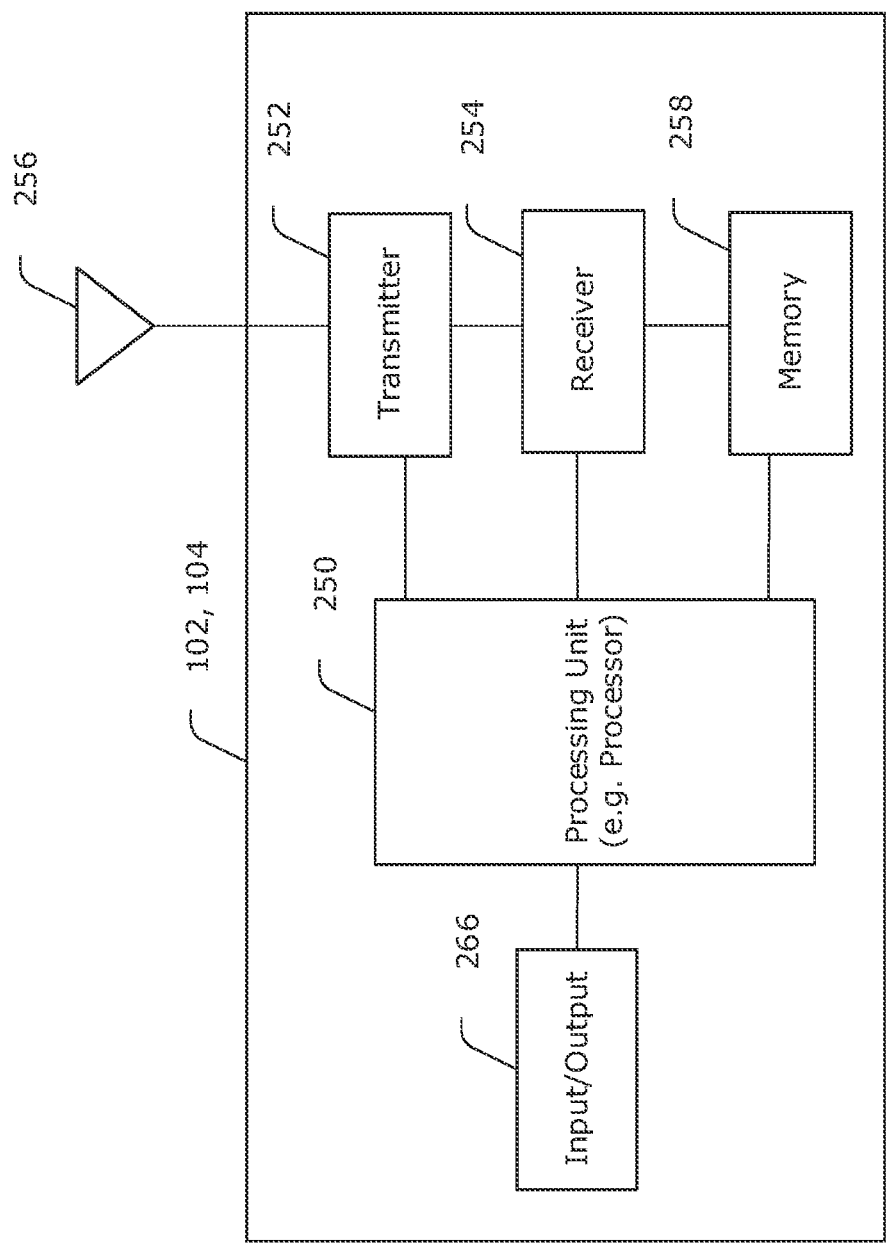
FIG. 7 is a block diagram illustrating an example electronic device that may act as an AP or receiving STA.

FIG. 7 shows an example electronic device, which can be a transceiving apparatus, that may act as an AP 102 or a receiving STA 104, includes at least one processing unit 250, at least one transmitter 252, at least one receiver 254, one or more antennas 256, at least one memory 258, and one or more input/output devices or interfaces 266. The processing unit 250 (which may include processor 105 in the case of STA 104, or processor 109 in the case of AP 102) implements various processing operations of the AP 102 or the receiving STA 104, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 can, for example, include a microprocessor, microcontroller, digital signal processor, field programmable gate array, or application specific integrated circuit.

The transmitter 252 and receiver 254 may collectively be used to implement WLAN transceiver circuit 106 in the case of STA 104 or WLAN transceiver circuit 110 in the case of AP 102. Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The memory 258 stores instructions and data used, generated, or collected by the AP 102 or the receiving STA 104. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method comprising:
   transmitting, by an access point (AP), a downlink frame to a receiving station (STA), the downlink frame comprising a preamble portion including a signal (SIG) field, wherein the SIG field comprises a first subfield including information representative of a total number of Long Training Fields (LTF) symbols transmitted by a plurality of collaborating APs.

2. The method of claim 1, wherein the transmitting the downlink frame comprises:
transmitting, by the AP, the preamble portion to the receiving STA based on a beamforming steering matrix that is used to transmit a payload portion of the downlink frame.

3. The method of claim 1, wherein the SIG field in the preamble portion further comprises a second subfield including second information representative of a total number of spatial streams transmitted by the plurality of collaborating APs to the receiving STA.

4. The method of claim 3, wherein the total number of LTF symbols is based on the total number of spatial streams transmitted by the plurality of collaborating APs.

5. The method of claim 1, wherein the SIG field in the preamble portion further comprises a third subfield including third information representative of a BSS color.

6. A method comprising:
receiving, by a receiving station (STA), a downlink frame from an access point (AP), the downlink frame comprising a preamble portion including a signal (SIG) field, wherein the SIG field comprises a first subfield including information representative of a total number of Long Training Fields (LTF) symbols transmitted by a plurality of collaborating APs.

7. The method of claim 6, wherein the SIG field in the preamble portion comprises a second subfield including second information representative of a total number of spatial streams transmitted by the AP to the receiving STA.

8. The method of claim 7, wherein the total number of LTF symbols is based on the total number of spatial streams transmitted by the plurality of collaborating APs.

9. The method of claim 6, wherein the SIG field in the preamble portion comprises a third subfield including third information representative of a BSS color.

10. A method of communication between an access point (AP) and a receiving station (STA) operating in a wireless local area network (WLAN), the method comprising:
transmitting, by the AP, a null data packet (NDP) frame to the receiving STA,
wherein the NDP frame includes a SIG field, the SIG field including information representative of a Basic Service Set identifier (BSSID) configured to be used by the receiving STA to determine a correct NDP frame for estimating a feedback matrix during a sounding process between a respective AP and the receiving STA.

11. The method of claim 10, wherein the information representative of a BSSID includes a BSS color.

12. An access point (AP) comprising:
at least one processor; and
a non-transitory computer readable storage medium storing programming, the programming including instructions that, when executed by the at least one processor, cause the AP to:
transmit a downlink frame to a receiving station (STA), the downlink frame comprising a preamble portion including a signal (SIG) field, wherein the SIG field comprises a first subfield including information representative of a total number of Long Training Fields (LTF) symbols transmitted by a plurality of collaborating APs.

13. The AP of claim 12, the instructions to cause the AP to transmit the downlink frame including instructions to cause the AP to:
transmit the preamble portion to the receiving STA based on a beamforming steering matrix that is used to transmit a payload portion of the downlink frame.

14. The AP of claim 12, wherein the SIG field in the preamble portion comprises a second subfield including second information representative of a total number of spatial streams transmitted by the plurality of collaborating APs to the receiving STA.

15. The AP of claim 14, wherein the total number of LTF symbols is based on the total number of spatial streams transmitted by the plurality of collaborating APs.

16. The AP of claim 12, wherein the SIG field in the preamble portion comprises a third subfield including third information representative of a BSS color.

* * * * *